United States Patent
MacPhail et al.

(10) Patent No.: US 7,677,447 B2
(45) Date of Patent: Mar. 16, 2010

(54) METHOD AND SYSTEM FOR AUTOMATED TELLER MACHINE REMOTE DIAGNOSTICS AND CONFIGURATION

(75) Inventors: Stephen Neil MacPhail, Dundee (GB); Bruce Shepherd, Angus (GB)

(73) Assignee: NCR Corporation, Dayton, OH (US)

( * ) Notice: Subject to any disclaimer, the term of this patent is extended or adjusted under 35 U.S.C. 154(b) by 639 days.

(21) Appl. No.: 11/512,008

(22) Filed: Aug. 29, 2006

(65) Prior Publication Data

US 2008/0121692 A1   May 29, 2008

(51) Int. Cl.
*G06K 5/00* (2006.01)
(52) U.S. Cl. .................. 235/380; 235/375; 235/379
(58) Field of Classification Search .......... 235/375, 235/379, 380
See application file for complete search history.

(56) References Cited

U.S. PATENT DOCUMENTS

| | | | |
|---|---|---|---|
| 5,884,073 A * | 3/1999 | Dent ............................. | 713/2 |
| 5,984,178 A * | 11/1999 | Gill et al. ...................... | 235/379 |
| 6,470,288 B1 * | 10/2002 | Keidel et al. .................. | 702/122 |
| 6,676,018 B1 * | 1/2004 | Trelawney et al. .......... | 235/381 |
| 6,789,730 B1 * | 9/2004 | Trelawney et al. .......... | 235/376 |
| 6,964,368 B1 * | 11/2005 | Trelawney et al. .......... | 235/379 |
| 6,966,486 B2 * | 11/2005 | Ferraro ......................... | 235/379 |
| 6,976,622 B1 * | 12/2005 | Trelawney et al. .......... | 235/379 |
| 7,025,257 B2 * | 4/2006 | Ferraro ......................... | 235/379 |
| 7,051,096 B1 * | 5/2006 | Krawiec et al. ............. | 709/223 |
| 7,093,750 B1 * | 8/2006 | Block et al. .................. | 235/379 |
| 7,163,144 B1 * | 1/2007 | Trelawney et al. .......... | 235/379 |
| 2006/0180656 A1 * | 8/2006 | Ferraro ......................... | 235/379 |

FOREIGN PATENT DOCUMENTS

| EP | 1 030 275 A2 | 8/2000 |
|---|---|---|
| EP | 1 096 447 A2 | 5/2001 |

* cited by examiner

*Primary Examiner*—Daniel A Hess
*Assistant Examiner*—Paultep Savusdiphol
(74) *Attorney, Agent, or Firm*—Gregory A. Welte

(57) ABSTRACT

Methods, systems, and software are disclosed for configuring an ATM. The ATM receives one or more configuration messages in an XML-based format. The ATM interprets the one or more configuration messages. The ATM restricts one or more ATM operations based on at least a portion of the one or more configuration messages.

9 Claims, 5 Drawing Sheets

METHOD AND SYSTEM FOR AUTOMATED TELLER MACHINE REMOTE DIAGNOSTICS AND CONFIGURATION

BACKGROUND

Automated teller machines (sometimes abbreviated as ATMs) can be configured to allow users to perform various financial transactions at any time. For example, many financial institutions, or banks, have one or more ATMs from which users may withdraw cash from a checking or savings account that corresponds to a card provided by the user. A user can be a customer of the financial institution or an administrator.

ATMs can also include devices called financial self-service terminals and kiosks. ATMs can perform one or more of a large number of user transactions in addition to simply withdrawing cash such as depositing cash or checks in an account, checking the balance in an account, and transferring funds between accounts. ATMs can also perform one or more of a large number of administrative transactions including updating ATM software and replenishing the cash supply of the ATM.

ATMs may be connected to a host computer of the acquiring institution by communications links. The communications links may be non-persistent, requiring the ATM to reinitiate communications with the host computer of the acquiring institution. The communications links may be persistent, requiring dedicated bandwidth.

ATMs include numerous hardware and software modules that may malfunction. Generally, an ATM is taken out of service when a malfunction occurs with one of these modules. While an ATM is out of service it is not available to users.

SUMMARY

In general, in one aspect, the invention features a method for performing remote diagnostics and configuration of an ATM. The ATM outputs one or more state messages. The one or more state messages are indicative of the functional status of the ATM. The ATM receives one or more configuration messages and interprets the one or more configuration messages. The one or more configuration messages are based in part on the one or more state messages. The one or more configuration messages contain instructions for performing one or more diagnostic routines. The one or more configuration messages are in an XML-based format. XML stands for eXtensible Markup Language. The ATM performs the one or more diagnostic routines. The ATM alters one or more operations of the ATM based, at least in part, on the one or more configuration messages.

In general, in another aspect, the invention features a system for performing remote diagnostics and configuration of an ATM. The system includes an ATM that includes one or more hardware modules and one or more software modules, a communication link coupled to the ATM, and a computer coupled to the communication link. The ATM is configured to output one or more state messages and receive and interpret one or more configuration messages. The one or more state messages are indicative of the functional status of the hardware and/or software modules of the ATM. The one or more configuration messages are based at least in part on the one or more state messages. The ATM is configured to receive the one or more configuration messages in an XML-based format. The one or more configuration messages include instructions for performing one or more diagnostic routines. The ATM performs the one or more diagnostic routines. The ATM is also configured to alter one or more operations of the ATM based, at least in part, on the one or more configuration messages. Altering one or more operations of the ATM comprises disallowing one or more types of transactions by users at the ATM and altering a display screen at the ATM.

In general, in another aspect, the invention features software, stored on a tangible storage medium, for performing remote diagnostics and configuration of an ATM. The software includes executable instructions that cause the at least one of the one or more processors to output one or more state messages, to receive and interpret one or more configuration messages, and to output a set of actions supported by the ATM. The one or more state messages are indicative of a functional status of the ATM. The one or more configuration messages are based, at least in part, on the one or more state messages and the set of actions supported by the ATM. The one or more configuration messages include instructions for performing one or more diagnostic routines. The instructions are limited by the set of actions supported by the ATM. The one or more configuration messages are in an XML-based format

DETAILED DESCRIPTION

Figure 1:
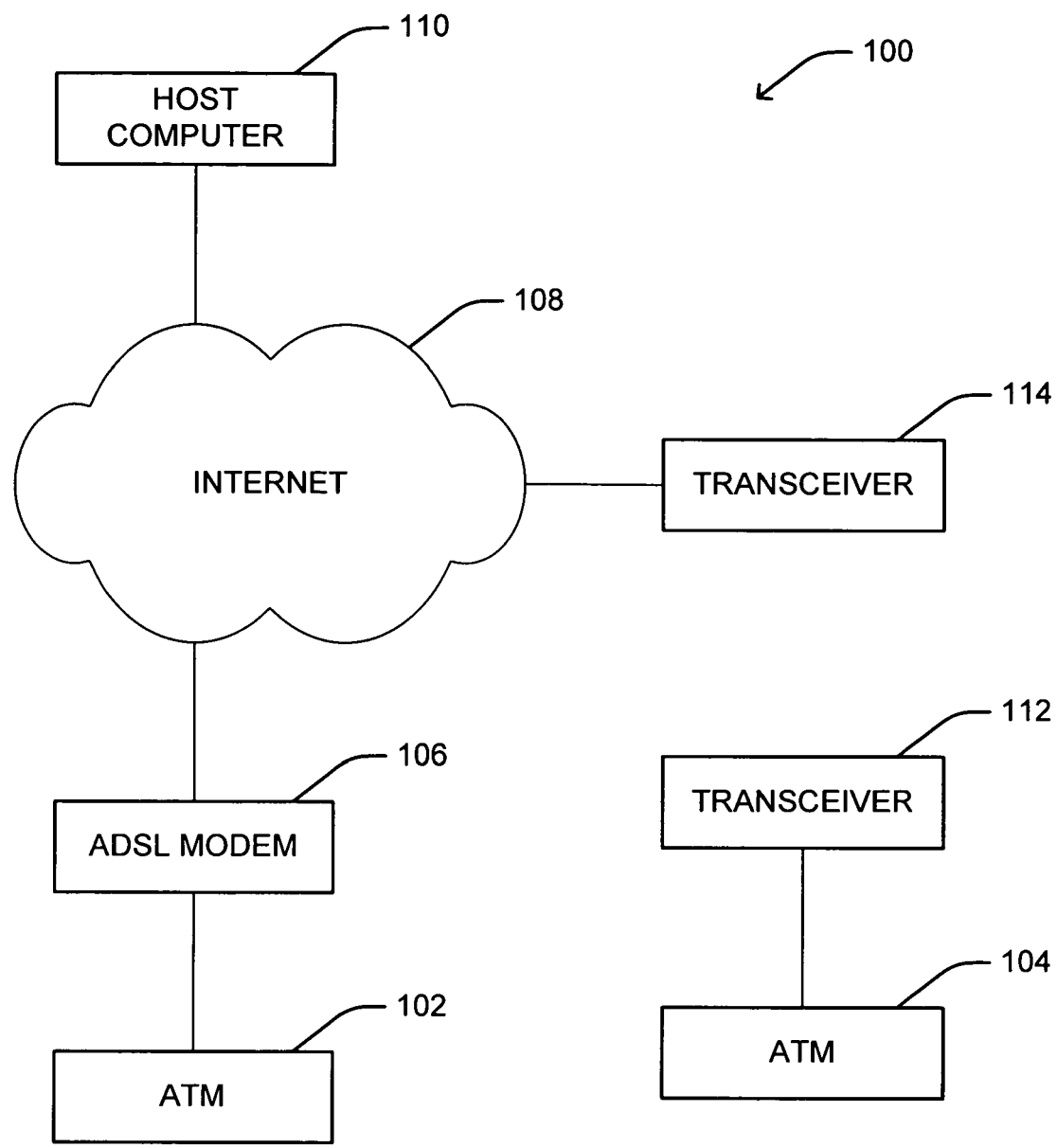
FIG. 1 is a diagram of a system for performing remote diagnostics and configuration of an ATM according to one exemplary implementation.
Figure 2:
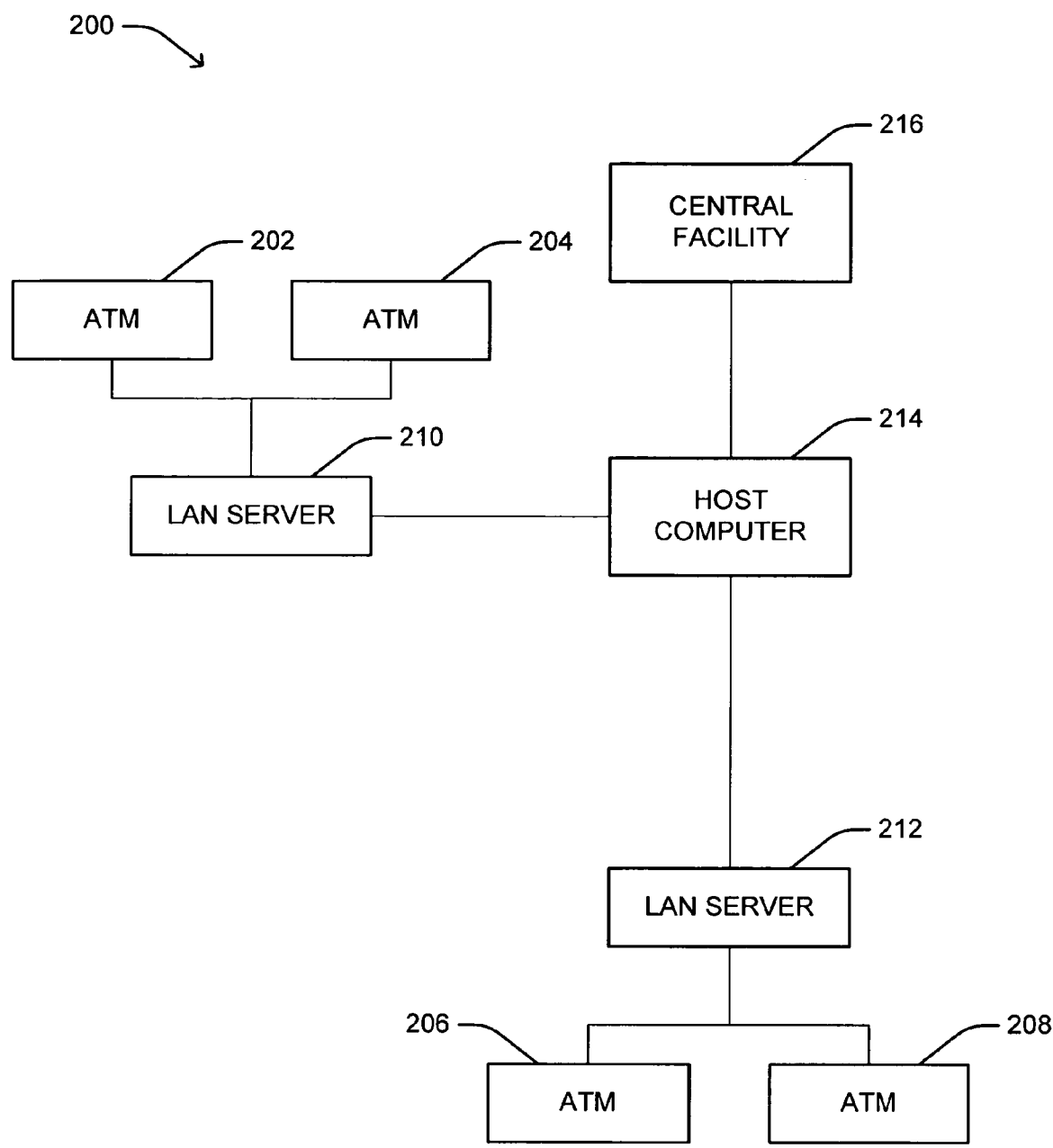
FIG. 2 is a diagram of a system for performing remote diagnostics and configuration of an ATM according to one exemplary implementation.

The ATM configuration techniques disclosed herein have particular application, but are not limited to groups of ATMs that are networked together for central administration. FIGS. 1 and 2 illustrate different implementations of system configurations for performing remote diagnostics and configuration of ATMs. Those systems are exemplary and many different systems for coupling a computer to an ATM using a communications link can be utilized with various communications technologies.

In FIG. 1, the system 100 includes two ATMs 102, 104, each with a communications link to a host computer 110. In the FIG. 1 implementation, the host computer is coupled to the Internet 108. ATM 102 communicates with a computer in the Internet 108 over an Asymmetric Digital Subscriber Line (ADSL) using an ADSL modem 106. ATM 104 communicates with a computer in the Internet 108 over a wireless connection established by two transceivers 112, 114 that exchange electromagnetic waves that are modified in a predetermined manner to indicate information. While ATMs 102, 104 may have different data transfer rates, each is coupled to the host computer 110 through a communications link that includes the Internet 108.

In FIG. 2, the system 200 includes four ATMs 202, 204, 206, 208 that are organized into two groups of two. Each group of ATMs is associated with a LAN server 210, 212 (LAN is an acronym for Local Area Network). System 200 can be used when multiple ATMs are associated with particular physical locations. For example, a bank or a shopping mall may have two or more ATMs. The first group of ATMs 202, 204 is coupled to LAN server 210. As one example, the ATMs 202, 204 can use an Ethernet protocol (such as Ethernet, 100Base-T, or Gigabit Ethernet) and architecture to route messages to and from the LAN server 210. Other LAN protocols and architectures can also be used. The second group of ATMs 206, 208 is coupled to LAN server 212. The LAN servers 210, 212 are coupled to the host computer 214, for example in a Wide Area Network (WAN). The communications between the LAN servers 210, 212 and the host computer 214 can travel through a public network such as the telephone system or the Internet. The communications between the LAN servers 210, 212 and the host computer 214 can also travel through private telecommunications devices such as a leased line or a satellite. While system 200 shows only two LAN servers 210, 212, additional LANs with two or more ATMs could be added. For example, a banking company may have hundreds of branches with each branch including one or more ATMs that are connected to a LAN for that branch. A LAN server employed with a particular bank branch can be called a branch controller. The LAN need not be dedicated to the ATMs. For example, computers used by branch employees may also be connected to the LAN and the WAN to send and receive information. As an alternative implementation, the ATMs 202, 204 may only send information to the LAN server 210 and not to the host computer 214. An employee of the branch with LAN server 210 can then determine whether to send a group of ATM communications on to the host computer 214 or an automatic process can be performed, for example at the end of the day. A central facility 216 can also be provided to store information received from the ATMs. For example, the host computer 214 can store information received from the ATMs 202, 204, 206, 208 for a set time period and forward older information to be stored at the central facility 216.

While FIGS. 1 and 2 illustrate particular network configurations, many other configurations are possible. For example, a single ATM may communicate with a single computer through a dial-up link. In other words, the ATM establishes a call only as part of the process for sending a message and does not maintain the call at other times. Such a call can occur over a copper wire connection or using a wireless connection established by a mobile phone as two examples. In addition, many different communications protocols can be used to encode information transmitted from the ATM(s), including but not limited to Transmission Control Protocol/Internet Protocol (TCP/IP), Synchronous Optical NETwork (SONET), and Code Division Multiple Access (CDMA). The information transmitted using these protocols can be compressed prior to transmission using, for example, one of several known compression techniques. The communications hardware includes but is not limited to electrical wires or cables, optical cables, and wireless transmitters and receivers.

In one implementation, the ATMs shown in FIGS. 1 and 2 are accessible by users for user transactions. The ATMs can include buttons, a card scanner, or a touch-sensitive screen by which the ATM receive instructions and information from a user. One example ATM can have a magnetic scanner, a screen, a group of number keys, and a group of buttons next to the screen. The ATM is programmed to have a transaction ready state where a user can initiate a transaction by inserting a card with a magnetic strip into the magnetic scanner. The ATM can read the magnetic strip to determine what information is on the card. The ATM may have suitable hardware to read a card that uses other data storage, such as a chip-embedded card. The ATM can then display a request for a code to be entered using the number keys. The ATM can then wait a predetermined amount of time to receive the code. If the correct code is entered, the ATM can then provide options with a graphical indication of the button that corresponds to each option to guide the customer through a transaction. The example ATM with these structures is configured to allow user transactions in which the ATM both displays information to the user and receives information from the user. The same structures can be used to perform administrative transactions. For example, a particular magnetic card and code can be used to initiate a transaction by a bank employee who inserted cash to replenish the ATM.

Typically, the ATM can have the capabilities to perform general types of transactions such as administrative tasks, debit, credit, balance transfer, or balance inquiry. Certain of these general types of transactions may have one or more specific implementations in the ATM based on the hardware capabilities and software configuration of the ATM. For example, the ATM can perform a debit transaction where the user enters the amount using the keypad (e.g., withdrawal) or a debit transaction where the user selects an amount from a set of amounts (e.g., fast cash withdrawal). The transactions available at an ATM, whether directed to users or administrative purposes, vary according to the hardware modules and/or software modules associated with the ATM. The hardware modules and/or software modules together define the types of operations of the ATM. For instance, an ATM can have a bill dispenser as a hardware module with associated software modules that allow users to request debit transactions. The operations associated with the debit transaction may include communicating with the bill dispenser, changing the display screen, dispensing cash, printing a receipt, and any other operation necessary to complete the requested debit transaction.

Figure 3:
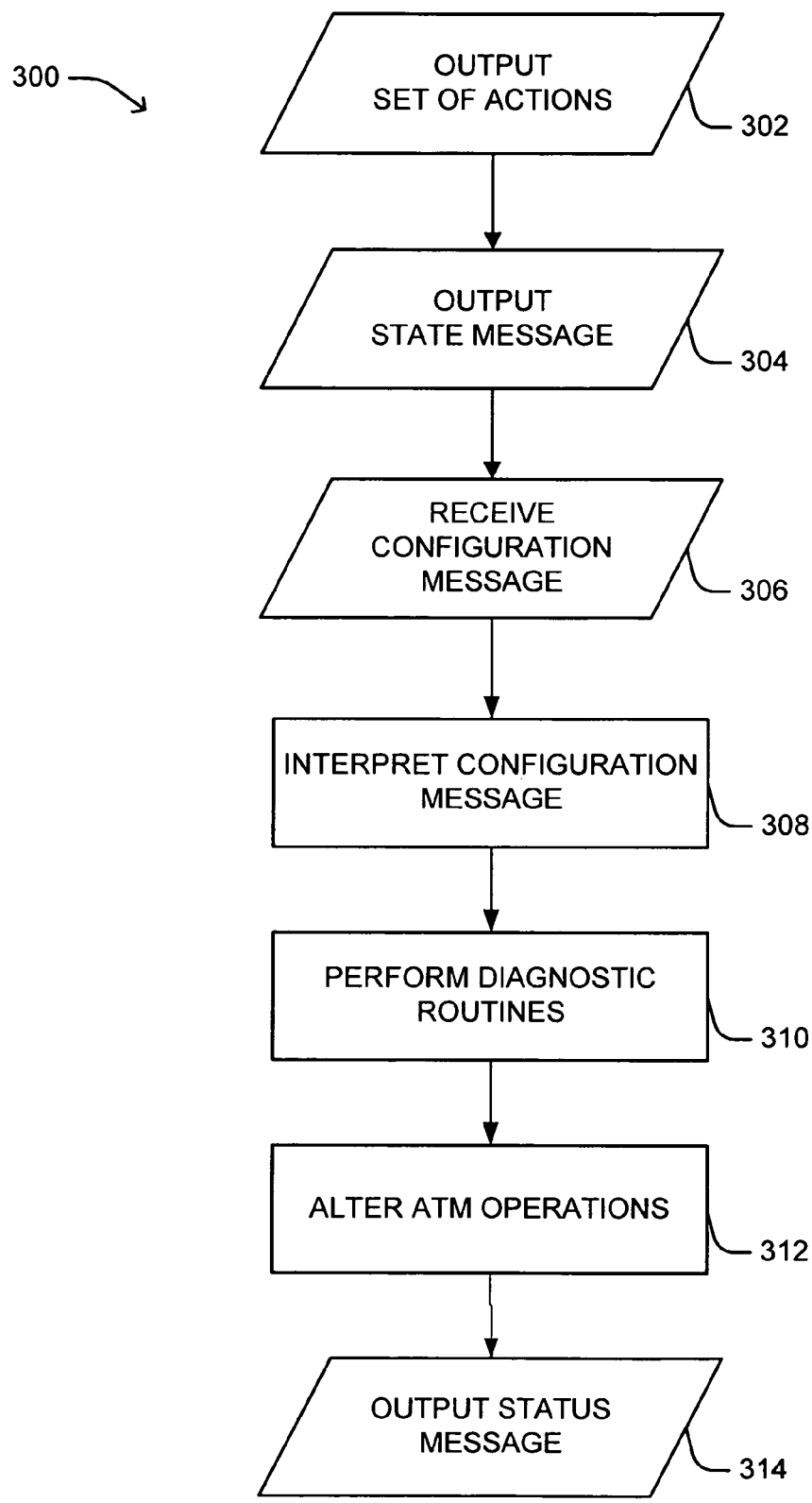
FIG. 3 is a flow chart of a method for performing remote diagnostics and configuration of an ATM according to one exemplary implementation.

FIG. 3 is a flow chart of an example method of performing remote diagnostics and configuration of the ATM, shown generally at 300. The ATM outputs a set of actions supported by the ATM (block 302). The ATM outputs a state message (block 304). The ATM receives a configuration message (block 306). The ATM interprets the configuration message (block 308). The ATM performs one or more diagnostic routines (block 310). The ATM alters one or more ATM operations (block 312). The ATM outputs a status message (block 314).

In certain example implementations, one or more of the blocks 302-314 are omitted. For example, the ATM hardware and software modules may be fully functional after performance of the diagnostic routines resulting in no ATM operations being altered. In this example, a status message indicative of full functionality would be outputted as shown in block 314 without performing the step of altering ATM operations in block 312.

In certain example implementations, the order of the blocks 302-314 may be altered. For example, ATM operations may be altered (block 312) before all diagnostic routines received by the ATM have been completely executed. Also, a status message may be outputted (block 314) after the performance of the diagnostic routines (block 310) before any of the ATM operations are altered in block 312.

As discussed above with regard to FIG. 3, the ATM outputs a set of actions supported by the ATM (block 302). The set of actions supported by the ATM define the types of diagnostic routines that may be executed by the ATM. In one example implementation, the ATM outputs the set of actions either in response to a request from the host computer 110 or when a condition or a set of conditions occur. Example conditions include, but are not limited to, a timed interval, a request by the host computer 110, or execution of instructions in one or more of the ATM's software modules. A single condition or a set of conditions may trigger the ATM to output the set of actions supported by the ATM. In another example implementation, the host computer 110 has been configured with the set of actions supported by the ATM stored in a database file, an XML configuration file, or any other suitable means. In this example, block 302 is not implemented. Also, the set of actions supported by the ATM stored on the host computer 110 may consist of a subset of the set of actions supported by the ATM.

As discussed above with regard to FIG. 3, the ATM outputs a state message (block 304). In certain example implementations, the ATM outputs a state message when a condition or a set of conditions occurs. Example conditions include, but are not limited to, a timed interval, a request by the host computer 110, or an error with one or more operations or with one or more hardware modules and/or software modules of the ATM. In another example implementation, the ATM outputs a state message based, at least in part, on the configuration of the ATM's software modules and not in response to a request from the host computer 110. In other example implementations, a state message can be outputted at any step in FIG. 3.

The ATM outputs the state message to a computer, such as the host computer 110. The state message includes a functional status for one or more of the hardware modules and/or the software modules associated with the ATM. The functional status is indicative of whether a particular hardware module or software module is functioning properly. For example, the ATM may have the capability to determine the functional status of a bill dispenser, an input hopper, a display screen, a communications link, or the numerous hardware modules and/or software modules associated with the ATM. The ATM may be configured to determine the functional status of any one or more of these hardware modules and/or software modules.

As discussed above with regard to FIG. 3, the ATM receives a configuration message (block 306) from the host computer 110. In one example implementation, the ATM receives the configuration message at any step in FIG. 3. In certain example implementations, the configuration message is sent from the host computer 110 in response to the state message outputted from the ATM in block 304. In this example, the host computer 110 generates a configuration message based, at least in part, on the one or more previously outputted state messages sent from the ATM (block 304). The configuration message includes instructions, in an XML-based format, for performing diagnostic routines. Certain example diagnostic routines are directed to any one or more of the hardware and/or software modules associated with the ATM. In one implementation, the host computer 110 supports the Interactive Financial eXchange (IFX) standard and the ATM is an IFX configured ATM.

The ATM interprets the configuration message (block 308) and performs one or more diagnostic routines (block 310). In certain example implementations, the diagnostic routines alter the operations of the ATM. In an example implementation, the diagnostic routines include instructions for the ATM to execute. These instructions may be included in one or more scripts. The one or more scripts may be implemented in XML that may be interpreted via .NET Reflection.

In certain example implementations, executing the instructions alters one or more ATM operations (block 312). The operations of the ATM that can be altered include, but are not limited to, disallowing user transactions at the ATM, altering display screens of the ATM, resetting the ATM, and powering-off the ATM.

Figure 4:
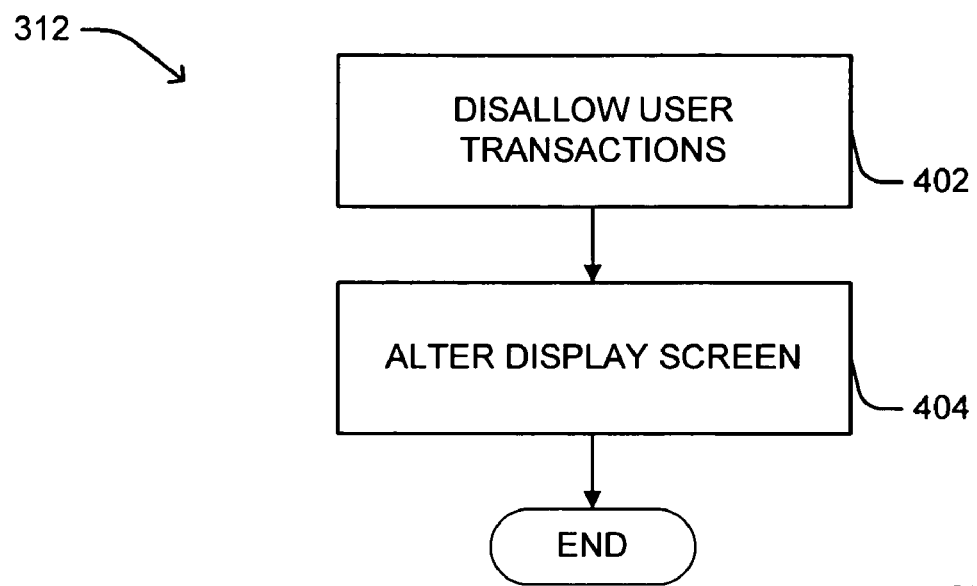
FIG. 4 is a flow chart for an ATM configuration message represented in an XML-based format according to one exemplary implementation.

FIG. 4 shows an example method for altering operations of an ATM (block 312, which is described above with respect to FIG. 3). The ATM disallows one or more user transactions (block 402). The ATM alters the display screen (block 404). In certain example implementations, one or both of blocks 402 and 404 are omitted. In certain example implementations, blocks 402 and 404 are performed in a different order.

User transactions include, but are not limited to, debit transactions, deposit transactions, balance inquiries, transfer of funds transactions, and any other suitable user transaction.

Altering the display screen to indicate the one or more disallowed user transactions includes, but is not limited to, displaying text messages, icons, flashing predefined indicators, and not displaying an option to access the disallowed transactions.

While FIG. 3 illustrates one sequence of remote diagnostics and configuration, many other sequences are possible. For example, after interpreting the configuration message (block 308) the ATM may not execute any diagnostic routines shown in block 310. In another example, the ATM may execute diagnostic routines without altering any ATM operations as shown in block 312. In yet another example, a first diagnostic routine may be executed. The outcome from this first diagnostic routine may cause further diagnostic routines to be executed. These diagnostic routines may be executed one or more times and may invoke one or more further diagnostic routines before an outcome indicates no further diagnostic routines should be executed.

In another example implementation, the ATM outputs a status message to host computer 110 after altering one or more ATM operations (block 312). The status message is indicative of the outcome of diagnostic routines performed in block 310. The host computer 110 may generate further configuration messages based, at least in part, on the status message outputted by the ATM. These further configurations may relate to the previous configuration messages or may include new diagnostic routines for the ATM. This cycle may continue until the ATM is functioning properly as indicated by a status message (block 314) or a state message (block 304) outputted by the ATM. Some example responses by the host computer 110 to a status message may include transmitting further configuration messages that are based, at least in part, on the previous status message interpreting the status message, determining that all operations of the ATM have been restored to complete functionality with no further action required, determining that a manual service call must be made, or any other suitable response.

Figure 5:
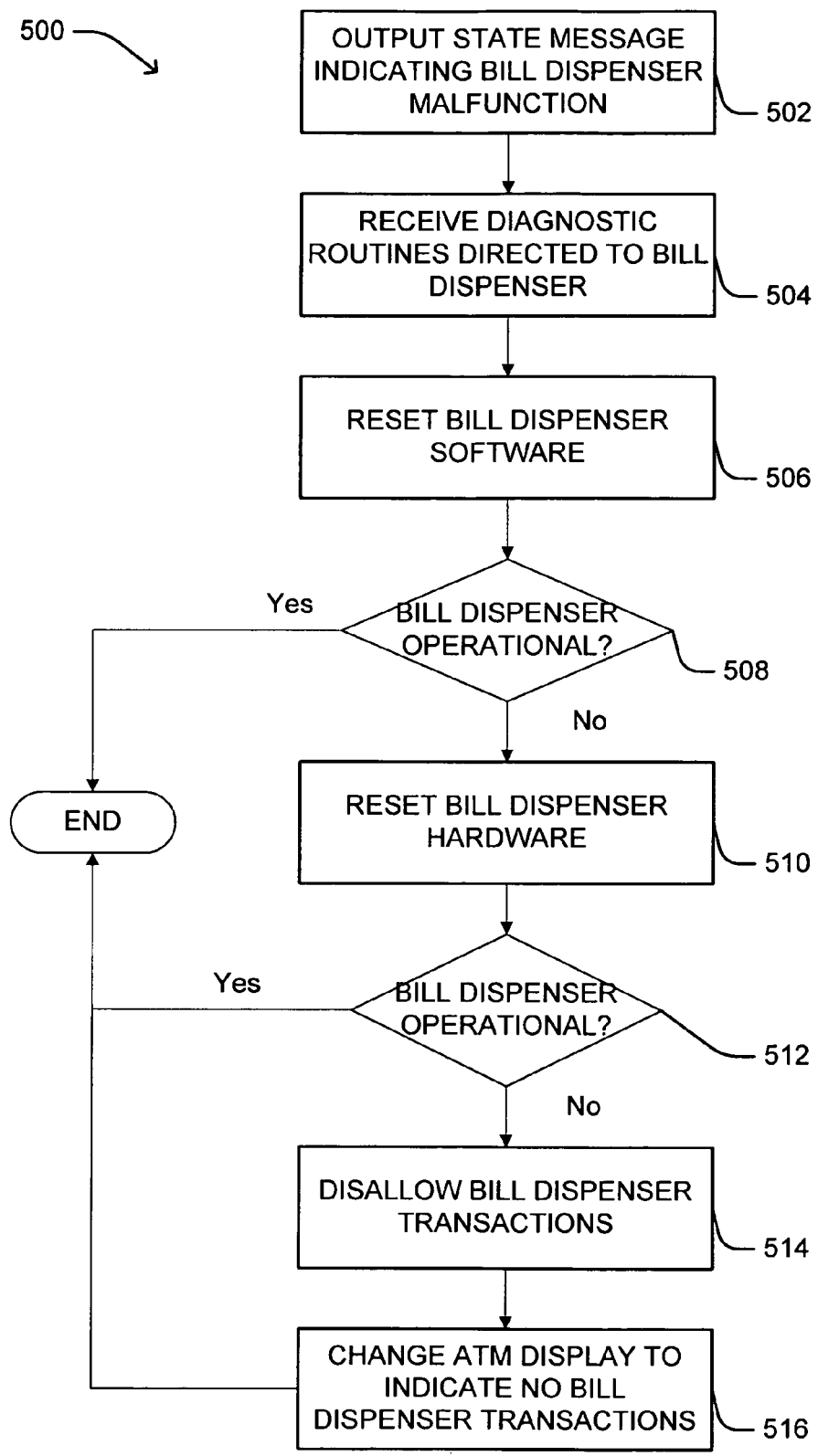
FIG. 5 is a flow chart for altering operations of an ATM according to one exemplary implementation.

FIG. 5 is a flowchart showing an example method of performing remote diagnostics and configuration of an ATM, shown generally at 500. The ATM outputs a state message, to the host computer 110, indicating that the bill dispenser has a malfunction (block 502). The functional status of the bill dispenser may indicate that the bill dispenser has a hardware malfunction, a software malfunction, a hardware and software malfunction or any other predetermined indication.

The ATM receives diagnostic routines directed to the bill dispenser (block 504). As discussed above with regard to FIG. 3, the diagnostic routines are part of the configuration message sent by the host computer 110 in response to the ATM outputting a state message. The first diagnostic routine resets the bill dispenser software (block 506). A second diagnostic routine obtains the functional status of the bill dispenser to determine whether the bill dispenser is operational (block 508). The outcome of requesting the functional status determines whether further diagnostic routines should be performed.

Another diagnostic routine resets the bill dispenser hardware if the functional status of the bill dispenser indicates that the bill dispenser is not operational (block 510). Yet another diagnostic routine is executed to determine whether the bill dispenser is operational (block 512) after resetting the hardware by checking the functional status of the bill dispenser. If the bill dispenser is still not operational, a diagnostic routine with instructions that disallow bill dispenser transactions (block 514) is executed. A diagnostic routine is also executed that changes the ATM display screen to indicate bill dispenser transactions are not allowed (block 516). If the diagnostic routines in blocks 506 and 510 cause an outcome indicating that the bill dispenser is operational, no further diagnostic routines are executed.

In one example implementation, the diagnostic routines to reset the bill dispenser (block 506) are based on the IFX standard. A first diagnostic routine may request that a Diagnostic class be executed. This class includes instructions to execute .NET Reflection scripts. These .NET Reflection scripts may include, but are not limited to, instructions to reset the bill dispenser software and/or hardware and to retrieve the functional status of the bill dispenser. Based on the outcome from executing one of the .NET Reflection scripts, subsequent .NET Reflection scripts may be executed. These scripts may continue to be executed until an outcome indicates that the bill dispenser is functional, has been taken out of service, or that any other predetermined condition has been satisfied. For example, the script to obtain the functional status may be executed after a script that resets the bill dispenser software and a script that toggles power to the bill dispenser. In this example, if an outcome indicates the bill dispenser should be taken out of service, yet another .NET Reflection script may be executed to display an appropriate message on the display screen.

The foregoing description of the implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of operating an automated teller machine (ATM), wherein the ATM comprises one or more hardware modules and one or more software modules, the method comprising:
 a) maintaining within the ATM a first diagnostic routine which at timed intervals tests a hardware module operated by the ATM;
 b) transmitting to software in a remote computer a state message which indicates results of the first diagnostic routine;
 c) receiving, from the remote computer, a message which
  i) resulted from analysis of the state message by the software in the remote computer and is produced by said software, and
  ii) includes a second diagnostic routine; and
 d) at the ATM, causing software to run the second diagnostic routine on the suspect hardware module upon receipt and send a second state message to the remote computer;
 e) causing the ATM to run one or more additional diagnostic routines on the suspect hardware module until either
  i) the diagnostic routines modify the suspect hardware module into an operative condition, or
  ii) the additional diagnostic routines
   A) produce an outcome which indicates that no further diagnostic routines should be run, and
   B) cause the suspect hardware module to be taken out of service.

2. Method according to claim 1, and further comprising:
 e) displaying at the ATM a notice to customers which indicates that services which require the suspect hardware module are not available.

3. Method according to claim 2, and further comprising:
 f) if a defect is found in the suspect hardware module by either diagnostic routine, using the ATM or the remote computer to contact a service technician.

4. Method according to claim 1, and further comprising:
 e) if a defect is found in the suspect hardware module by either diagnostic routine, using the ATM or the remote computer to contact a service technician.

5. Method according to claim 1, in which the second diagnostic routine is specific to the suspect hardware module.

6. A method of operating an Automated Teller Machine, ATM, which communicates with a host computer, comprising:
 a) maintaining software in the ATM which causes the ATM, at timed intervals, to run a diagnostic routine which
  i) examines hardware components within the ATM,
  ii) detects whether one of the hardware components is malfunctioning, and
  iii) issues a first state message indicating functional status of the components examined, including indicating the malfunctioning status of the malfunctioning component;
 b) causing the ATM to transmit the first state message to the host computer;
 c) causing software in the host computer to
  i) examine the first state message and,
  ii) in response, send to the ATM a configuration message which instructs the ATM to run a second diagnostic routine on the detected malfunctioning component;
 d) causing the ATM to
  i) run the second diagnostic routine on the detected malfunctioning component,
  ii) produce a second state message, and
  iii) transmit the second state message to the host computer; and
 e) causing the ATM to run one or more additional diagnostic routines on the detected malfunctioning component until either
  i) the diagnostic routines modify the malfunctioning component into an operative condition, or
  ii) the additional diagnostic routines
   A) produce an outcome which indicates that no further diagnostic routines should be run, and
   B) cause the malfunctioning component to be taken out of service.

7. Method according to claim 6, in which either the ATM, the host, or both, issue a call to a service technician to manually service the malfunctioning component which was taken out of service in paragraph (e) (ii) (B).

8. Method according to claim 6, in which software within the ATM issues a signal to customers indicating that services which require the component which was taken out of service in paragraph (e) (ii) (B) are not available.

9. A method of operating an Automated Teller Machine, ATM, comprising:

a) maintaining a host computer, remote from the ATM, which communicates with the ATM and which contains host software;
b) within the ATM, maintaining ATM software which
   i) runs a diagnostic routine upon hardware components within the ATM at timed intervals, which diagnostic routine produces a first state message which indicates functional status of the hardware components, including identity of a malfunctioning component;
   ii) transmits the first state message to the host software;
   iii) receives from the host software a first configuration message which
      A) resulted from analysis by the host software of the first state message and
      B) instructs the ATM software to run a specified diagnostic routine on the identified malfunctioning component;
   iv) runs the specified diagnostic routine upon receipt, which produces a first status message which indicates outcome of the specified diagnostic routine;
   v) transmits the first status message to the host software;
   vi) receives from the host software a second configuration message which
      A) resulted from analysis by the host software of the first status message and
      B) instructs the ATM software to run one or more additional diagnostic routines on the identified malfunctioning component;
   vii) runs diagnostic routines, including one or more of said additional diagnostic routines, until either
      A) the diagnostic routines modify the malfunctioning component into an operative condition, or
      B) the diagnostic routines
         1) produce an outcome which indicates that no further diagnostic routines should be run, and
         2) cause the malfunctioning component to be taken out of service.

* * * * *